United States Patent [19]

Wang

[11] Patent Number: 4,785,568
[45] Date of Patent: Nov. 22, 1988

[54] SPECIFIC ARROW FOR FISHING IN SHORE

[76] Inventor: Anthonyo Wang, 4th Fl., No. 56, Wenchang Rd., Shihlin District, Taipei, Taiwan

[21] Appl. No.: 99,145

[22] Filed: Sep. 18, 1987

[51] Int. Cl.$^4$ ............................................. A01K 91/02
[52] U.S. Cl. ............................................. 43/19; 43/6; 273/419
[58] Field of Search ........................ 43/19, 6; 273/419

[56] References Cited

U.S. PATENT DOCUMENTS

| | | | |
|---|---|---|---|
| 1,457,983 | 6/1923 | Malone | 43/6 |
| 2,090,731 | 8/1937 | Klein | 43/19 |
| 2,796,691 | 6/1957 | Norris | 43/6 |
| 3,227,454 | 1/1966 | Ellenburg | 43/6 |

Primary Examiner—Gene P. Crosby
Attorney, Agent, or Firm—Ho & Chu

[57] ABSTRACT

A specific arrow for fishing in shore, the arrow is shot farther from shore by a bow for a good catch of fish. It provides a closed arrow sleeve tube connected to the body of an arrow and a ring is positioned at the front end of the closed arrow sleeve tube, the ring can spin relative to the closed arrow sleeve tube to prevent the body of the arrow from becoming entwined by fishline.

1 Claim, 3 Drawing Sheets

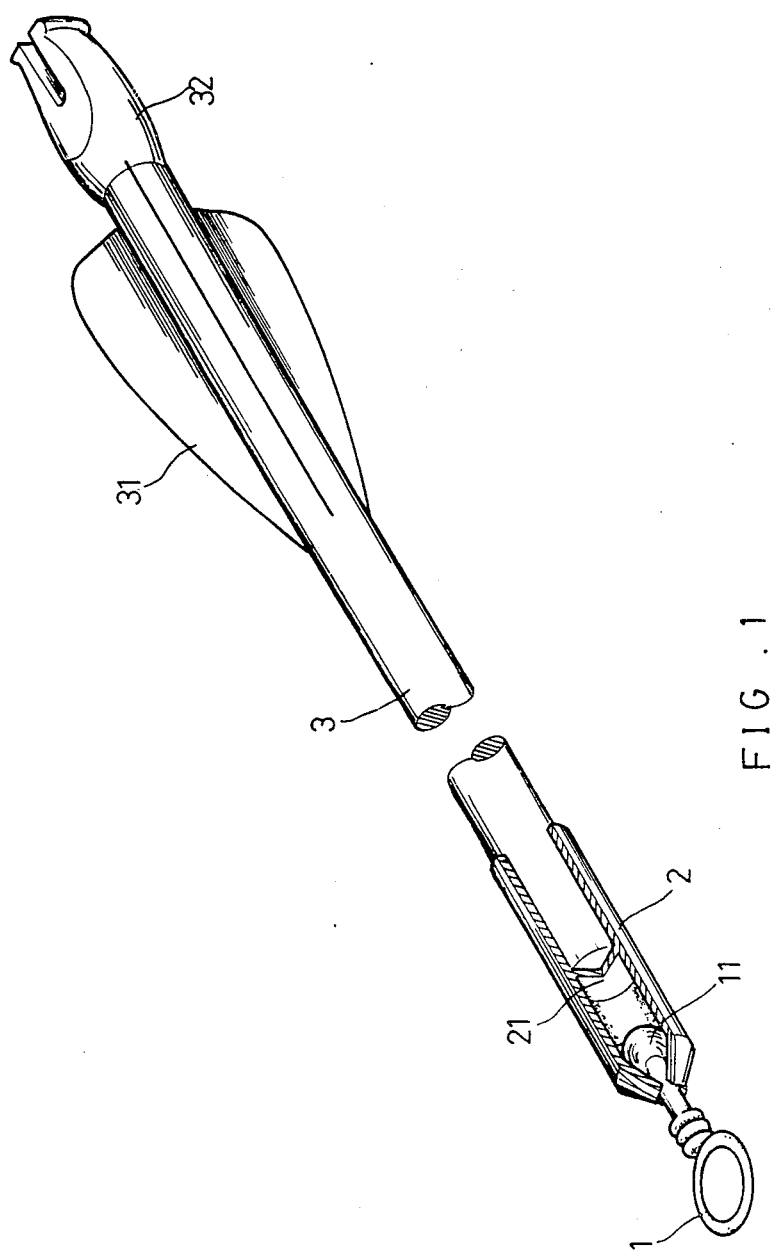

SPECIFIC ARROW FOR FISHING IN SHORE

BACKGROUND OF THE INVENTION

The present invention relates to an arrow for fishing from shore and especially describes a specific arrow which is shot out by a bow to achieve farther distance from shore for fishing; the said specific arrow also can be designed as a buoy or a sinker.

Recently, industry and commerce are prosperous, people are living in a nervous and busy society; in order to find a release from this nervous living people are crowding toward outdoors on holidays and engaging in leisure activities. Fishing is one of the most popular leisure activities on holiday. Whether fishing from in shore, fishermen stand on projecting rocks or walk down into the water in order to throw bait to a farther distance or some appointed area for a good catch of fish. Such fishing will induce frequent danger to the fisherman because the fishermen usually knows nothing about the topography and specific property of the sea or lake, or some extraordinary situation may arise suddenly, to cause an accident.

SUMMARY OF THE INVENTION

For the sake of increasing safety for the fisherman, also the bait can be thrown to a farther distance, the inventor has researched for more than 10 years to invent a specific arrow for fishing from shore with the purpose of safety for fishing and to throw bait farther for a good catch of fish.

The main function of the present invention is to improve the defect of the conventional fishing throw, the specific arrow is shot out by a bow with hook and fishline, so from now on, the fisherman can do what he wants, shoot bait to a farther distance or any appointed area; so people who are engaged in fishing now can be far away from dangerous waves because of the present invention, and fishing at safer positions decrease the misgiving of safety also can increase a good catch of fish and raise joys of fishing, besides, it can attract more people who were worrying about safely now to to join fishing activity that is full of challenge and achievement.

The present invention is characteristic of a ring positioned at the front end of an arrow which is a leading ring of fishline, when the arrow is shot out, the ring leads fishline along to somewhere far away from shore and sinks down to achieve a farther throw to the fishline, the ring also can spin to prevent the body of the present invention from being tangled by fishline.

The present invention is also characteristic of a sleeve shaped closed tube which is positiond at the font end of the arrow with a separate plate inside to prop against the body of the arrow.

BRIEF DESCRIPTION OF THE DRAWING

FIG. 1 is a prospective cross section view of the present invention.

DETAILED DESCRIPTION

Figure 3:
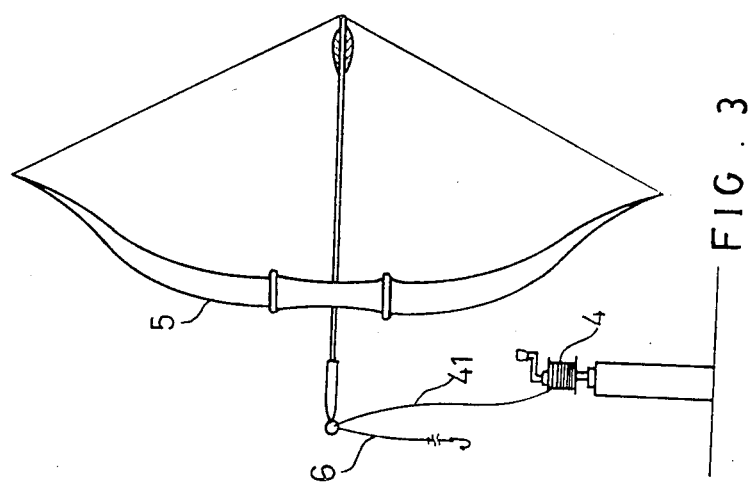
FIG. 3 is a view of a second method of use for the present invention.

Please refer to the prospective cross section view of the arrow shown in FIG. 1. The present invention is comprised of a ring (1), a closed arrow sleeve tube (2) and a body (3) of the arrow.

The ring (1) connects a metal ball (11), and the metal ball (11) is pressed into the front end of the arrow sleeve (2), the ring (1) is positioned at outside of the arrow sleeve (2), and the ring (1) can spin with respect to the arrow sleeve (2).

The metal ball (11) is pressed into a hole positioned at the front end of the closed arrow sleeve tube (2) with a separate plate (21) inside to prop against the body (3) of the arrow.

The feathers (31) are positioned at the tail of the body (3), that can stablize the flying direction and posture and decrease the tensile stress of the air; a concave V-shaped groove (32) is positioned at the tail of the body (3), it provides a fixing point for the string of the bow in use of a bow to shoot the arrow, enabling the string to concentrate momentum of the string onto the concave groove (32), therefore, the arrow can be shot out with very high speed. The body (3) of the arrow is made of lighter material.

Figure 2:
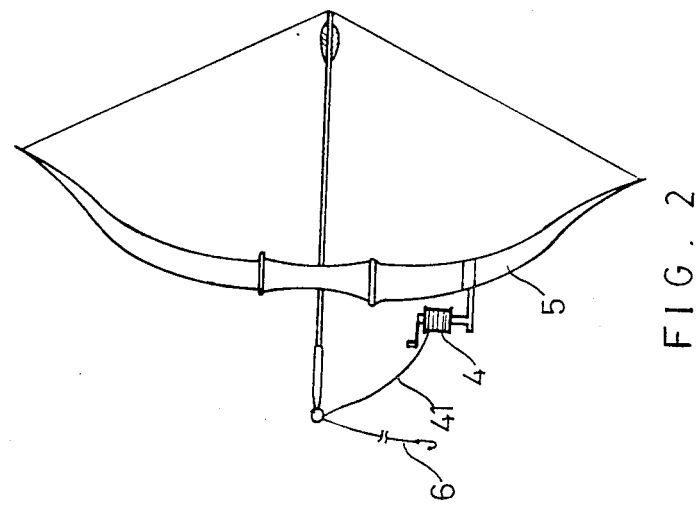
FIG. 2 is a view of a first method of use for the present invention.
Figure 4:
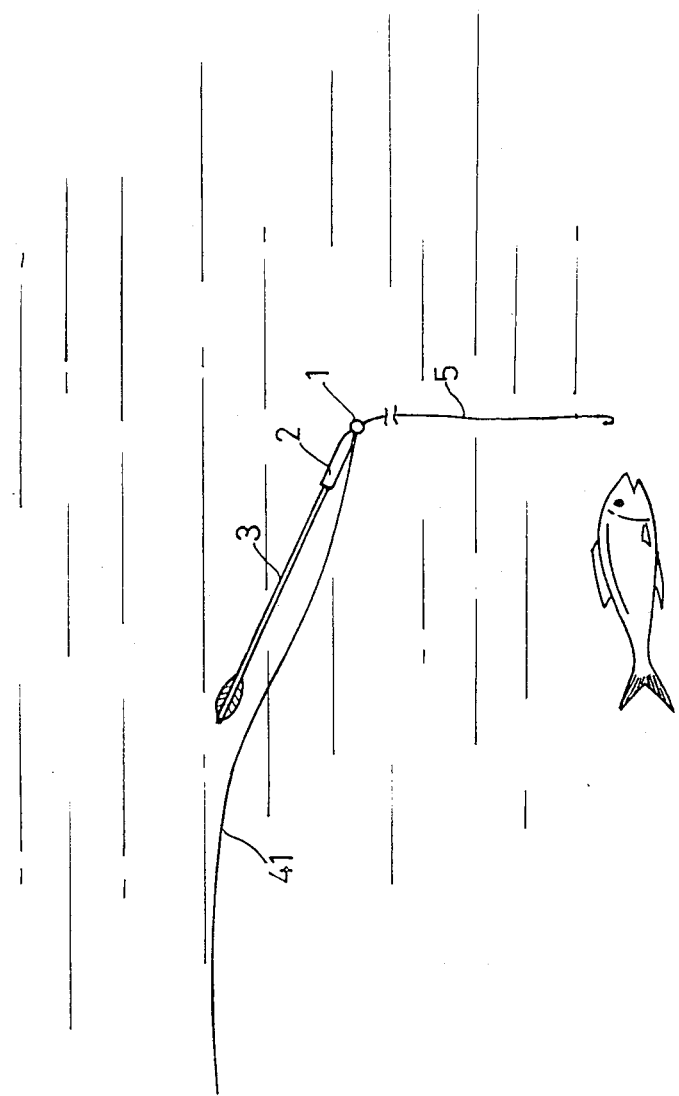
FIG. 4 is a view of the practical use to the present invention.

The present invention can be used with a fishline spool (4) positioned on a bow (5), a fishline (41), and a snell (6) on the ring (1) positioned at the front end of the arrow as shown in FIG. 2, the invention can be shot far from shore; in addition, it also can be used with a fishline spool positioned on the post erected on the ground as shown in FIG. 3, and after the arrow is shot far away from shore, it will sink down into water, as shown in FIG. 4. When the bow (5) shoots out the present invention, the ring (1) can spin, so the fishline will never tangle on the body (3) of the arrow and forms separation as shown in FIG. 4.

Consequently, the present invention provides a specific arrow for fishing from shore, which can increase the safety of fishing and the joys to choose the area to throw bait as fishermen favour.

I claim:

1. A specific arrow for fishing in shore comprising a ring, a closed arrow sleeve tube and a body of the arrow, characterized by a metal ball;

said ring being connected to said metal ball;

said closed arrow sleeve tube is hollow, and a hole is positioned at the front end of said arrow sleeve tube;

a partition plate positioned inside said arrow sleeve tube;

said metal ball connected with said ring having been staked in said hole, enabling said ring to spin relative to the closed arrow sleeve tube; and said body of the arrow being inserted and fixed at the tail end of said arrow sleeve.

* * * * *